Patented July 25, 1950

2,516,119

UNITED STATES PATENT OFFICE 2,516,119

METAL, PHOSPHORUS, AND SULFUR-CONTAINING ORGANIC COMPOUNDS

Joseph M. Hersh, Ponca City, Okla., assignor to Continental Oil Company, Ponca City, Okla., a corporation of Delaware No Drawing. Original application August 9, 1945, Serial No. 609,809. Divided and this application March 30, 1946, Serial No. 658,574

18 Claims. (Cl. 260—139)

This invention relates as indicated to lubricants but in its broader aspects includes the provision of new compositions of matter and methods of producing the same, which materials have among their many uses that of an improving agent for mineral lubricating oils.

This application is a division of my copending application Serial No. 609,809, filed August 9, 1945.

While the present invention in its broader aspects thus provides new materials or compositions of matter which will be found of utility in other fields of use, their particular usefulness as an improving agent for lubricating compositions will be referred to as illustrative of their many properties since such use is in itself a part of the present invention. It is, therefore, an object of this invention to provide a poly-functional additive for hydrocarbon products which will inhibit corrosion, sludge, acidity, and lacquer formation on lubricated parts.

Another object of this invention is to provide a poly-functional additive which has particular storage stability in hydrocarbon oil blends.

A further object of this invention is to provide a poly-functional lubricant additive having improved solubility characteristics in hydrocarbon oils of the lubricant type.

A still further object of this invention is to provide a lubricant additive composition which has particular stability to hydrolysis under conditions of atmospheric storage either alone or in mineral oil blends.

Yet a further object of this invention is to provide a poly-functional additive having particular and outstanding thermal stability in hydrocarbon oil blends.

An additional object of this invention is to provide a lubricant additive whose use in lubricating compositions will contribute particular noncorrosion properties, antioxidant properties, metal-deactivating properties, antisludging properties, and high oiliness to a lubricant blend containing such additive.

Other objects and advantages of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises providing:

I. The organic material containing phosphorus, sulfur, and a metal in chemical combination produced by treating a phosphorus and sulfur containing organic compound with a metal and sulfur containing reagent; or more specifically the material containing phosphorus, sulfur, and a metal in chemical combination produced by treating the reaction product of an organic compound and a phosphorus and sulfur containing reagent with a metal and sulfur containing reagent.

II. The method of producing an organic material containing phosphorus, sulfur, and a metal in chemical combination which comprises treating a phosphorus and sulfur containing organic compound with a metal and sulfur containing reagent; or more specifically the method of producing a material containing phosphorus, sulfur, and a metal in chemical combination which comprises treating the reaction product of an organic compound and a phosphorus and sulfur containing reagent with a metal and sulfur containing reagent.

III. A lubricating composition comprising a mineral oil solution of a material containing phosphorus, sulfur, and a metal in chemical combination produced by treating a phosphorus and sulfur containing organic compound with a metal and sulfur containing reagent; or more specifically a lubricating composition comprising a mineral oil solution of a material containing phosphorus, sulfur, and a metal in chemical combination produced by treating the reaction product of an organic compound and a phosphorus and sulfur containing reagent with a metal and sulfur containing reagent.

It will be observed from the ensuing description that in its broadest aspects the present invention is concerned with organic materials containing phosphorus, sulfur, and a metal in chemical combination, which material has preferentially a substantial amount of titratable alkalinity.

As indicated in the foregoing broad statement of the invention, the materials with which this invention is concerned can be best and most accurately defined by having reference to their mode of preparation. In its broadest aspects the invention contemplates products resulting from the reaction of a metal and sulfur containing reagent with a phosphorus and sulfur containing organic compound. This latter class of materials, i. e. the materials with which the metal and sulfur containing reagent is caused to react fall into two broad classes, viz:

A. Those organic compounds which are the reaction product of an organic compound and a phosphorus and sulfur containing reagent. This class is preferred for use.

B. Those organic compounds which contain phosphorus and sulfur in chemical combination either in their naturally occurring state or prepared by means other than the preferred procedure indicated below.

The reaction products which comprise the phosphorus and sulfur containing materials of the preferred class A above can best be identified by having reference first to the various organic compounds which may be utilized in the stated reaction; and then by having reference to the various phosphorus and sulfur containing reagents which may be reacted with such organic compounds.

Accordingly for an indication of the nature of the organic compounds which have been found best suited for use in the indicated reaction and illustrative of the broad class of organic compounds thus usable, reference may be had to the following table:

TABLE I

ORGANIC COMPOUNDS

*Acyclic and carbocyclic compounds*

I. Hydrocarbons
    Saturated, straight and/or branched chain,
        hexane
        octane
        isooctane
        decane
        hexadecane
    Olefinic, diolefinic, triolefinic, acetylenic, diacetylenic
        octadecene
        wax olefin
        dodecene
        polymerized isobutene
        amylene
        ethylene
        acetylene
    Polymethylene, cyclic olefinic, cyclic diolefinic
        cyclohexene
        methyl cyclohexene
        bicyclohexadiene
    Aromatic, alkylated aromatic, polynuclear aromatic
        benzene
        waxylated benzene
        diamyl benzene
        octadecyl naphthalene II. Halogen derivatives
    Cl, Br, I, F, or mixed halogens
        lauryl chloride
        octadecyl bromide
        p-chloroamylbenzene
        chlor wax
    Mono, di and polyhalogenated
        p,p'-dibenzyl dichloride
        α-bromo-p chloro benzene
        polychlor naphthalene III. Oxygen derivatives—Monohydric
    A. Alcohols, saturated monohydric
        methanol
        cyclohexanol
        methyl cyclopentanol
        lauryl alcohol
        stearyl alcohol
    Alcohols, unsaturated monohydric
        oleyl alcohol
        cinnamyl alcohol
        furyl alcohol
        phen-ethyl alcohol
    Alcohols, unsaturated-olefinic, diolefinic
        methyl cyclohexadienol
        9,12-octadecadienol
    Alcohols, unsaturated acetylenic
        allyl alcohol
    Alcohols, hydroaromatic, saturated and unsaturated as above
        dimethyl cyclopentanol
        phenyl cyclohexanol
        diamyl cyclohexanol
    Alcohols, aromatic
        Phenyl paraffinic
            phenyl ethyl alcohol
            wax phenyl-propanol
            butyl phenyl carbinol
    Alkylphenols, substituted phenols
        Phenols, naphthols
            p-phenylphenol
            alpha naphthol
            cresol
            hydroquinone
            catechol
            dibutyl phenol
            t-butyl phenol
            octylphenol
            amylthiophenol
            laurylthiophenol
            sulfurized wax phenols
            condensed wax phenols
            p-chlorophenol
            1-bromo-4-naphthol
        Oxyphenyl paraffin alcohols
            p-hydroxyphenyl stearyl alcohol
            2,6 diamyl-4-betahydroxyethyl thiophenol Alcohol derivatives
    Metal salts, alcoholates
        Sodium triphenyl silicolate
        Sodium, potassium, calcium, or aluminum alcoholates
        Calcium wax-phenolate
        Sodium lauryl thiophenolate
    Ethers, simple and mixed, and thioethers
        octadecyl-phenyl ether
        lauryl sulfide
        p-hydroxyphenyl ether
        condensed wax-phenyl ethers sulfides
    Esters of mineral acids
        di-methyl cyclohexyl dithiophosphate
        trilauryl thiophosphate
        waxylated phenol benzene sulfonate
    Esters of organic acids
        octyl dilauryl succinic acid
        methyl ricinoleate
        dibutyl gallate
    Sulfur derivatives
        sulfurized butyl phenol
        sulfurized oleyl alcohol
        p-thiophenylphenol
    Selenium and tellurium compounds
        octadecyl-p-hydroxy phenyl selenide
        dioctyl telluride
    Nitrogen derivatives
        p-hydroxy phenyl pyridine
        dimethyl amine octyl phenol
        cyclohexanol amine
    Phosphorus derivatives
        trilauryl phosphine
        phenyl dioctyl phosphonic acid
        tributyl phosphite
    Compounds of As, Sb, Si, B, Si, Ge, Sn, Pb, Zn, Hg, Mg, etc.
        p-triethyl tin-phenyl dibutyl silicol
        octadecyl arsinic acid
        diethyl silicon dioleyl ester B. Aldehydes
    Paraffin and cycloparaffin series
        dodecyl aldehyde
        methyl cyclohexylal
        oenanthyl aldehyde
        stearyl aldehyde
    Halogen derivatives
        4-chloro-butyral
        p-bromo cinnamic aldehyde
        trichlorobutyraldehyde
        beta-phenyl-aldol
    Condensation products
        phenol-butyral condensates
        cresol-furfural condensates
    Sulfur derivatives
        polymeric acetaldehyde
        sulfurized benzaldehyde
        beta thiophenyl acetal
        thiophenol-formal condensation products
    Nitrogen derivatives
        hexamethylenetetramine
        9-octadecene amide
        phenyl hydrazone
    Olefinic aldehydes
        citronellal
        rhodinal
        geranial
        tiglic aldehyde
    Acetylenic aldehydes
        amylpropiolic aldehyde
        dodecyl propiolic aldehyde
    Aromatic aldehydes
        benzaldehyde
        triphenyltrithiane
        p-chlorobenzaldehyde C. Ketones
    Paraffin and cyclo-paraffin series
        caprinone
        laurone
        stearone
        isophorone
        azelaone
        methyl pentadecyl ketone
    Halogen derivatives
        methyl dibromoheptadecylketone
        methyl chloro-nonylketone
    Alkyl ethers
        dipropylketone orthohexyl ester
    Ketone halides
        dichlorocaprylone
        methyl t-butyl dichloromethane
    Sulfur derivatives
        Pinacoline thiolic anhydride
        thioacetone, condensed
        trithiolaurone
    Nitrogen derivatives
        methyl butyl ketone phenyl hydrazone
        dicaproneamine
    Olefinic and diolefinic ketones
        mesityloxide
        phorone
        camphorone
    Acetylene ketones
        acetyl oenanthilidene
        dodecyl oenanthylidene
    Aromatic ketones
        anthraquinone
        naphthoquinone
    Aryl paraffin ketones
        dibutyl acetophenone
        Michler's ketone
        wax naphthylketone D. Carboxylic acids
  Monobasic—Saturated
    stearic
    lauric
    margaric
    capric acids
    Esters
      methyl stearate
      lauryl palmitate
      phenyl stearate
      octyl arachidate
    Acid halides
      butyryl chloride
      stearylchloride
      laurylbromide
    Acid anhydrides
      stearic anhydride
      elaidic anhydride
      pelargonic anhydride
      palmitic anhydride
    Thioacids
      thiostearic acid
      thiopalmitic acid
      isoamyldithionic acid
    Acid amides and amino derivatives
      9-octadecene amide
      lauramide
      myristamide
    Acid hydrazides
      stearohydrazide
      tributyrohydrazide
    Acid azides
      propionyl azide
    Acid nitriles
      oenanthyl nitrile
      pelargononitrile
      octylcyanide
    Acid amide-chlorides

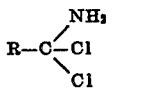

Palmiticamide chloride

Acid imido-ethers

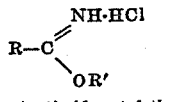

Acetimido octylether

Acid thiamides

Thiocaprylamide
Thiolauramide

Acid thio-imido-ethers

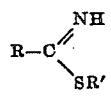

Stearamide thiophenyl ether

Acid amidines

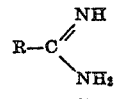

Lauramidine

Acid hydroxamic acids
  form-hydroxamic acid
Acid hydroximic acid chlorides
  aceto-hydroxamic acid chloride
Acid amidoximes
  stearyl amidoxime
  laurenyl amidoxime
  myristyl amidoxime
Acid hydroxamic oximes

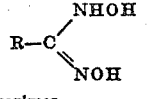

Acid nitrosoximes

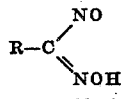

Acid hydrazidine and hydrazo-oximes

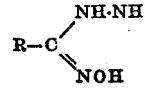

Ortho fatty acid derivatives
  orthocaprictributylester
Halogen substituted fatty acids
  trichlorophenylstearic acid
  α-chloromyristic acid
Monobasic unsaturated acids
  Oleic acid, ricinoleic acid
    linoleic acid
    nonylenic acid
    erucic acid
    polymethacrylic acid
  Acetylenic carboxylic acids
    stearolic acid
    propiolic acid
    nonylpropiolic acid
  Diolefinic carboxylic acids
    linoleic acid
    linolinic acid
  Aryl-alkyl carboxylic acids
    diphenyl acetic acid
    diamyl benzoic acid
IV. Oxygen derivatives—Dihydric
  Dihydric alcohols or glycols
    pentamethylene glycol
    polyethylene glycols
    pinacone
  Aldehyde—Alcohols
    aldol
    butyric isovaleric aldol
  Ketone alcohols
    propionyl carbinol
    aci isocaproyl acetaldehyde
  Dialdehydes
    succinic dialdehyde
    suberic dialdehyde
  Ketone-Aldehydes
    levulinic aldehyde
  Diketones
    alpha dicaproyl diketone
    beta dicaproyl diketone
    gamma dicaproyl diketone
    Nitrogen derivatives
      diacetyl hydrazone
      phenylamido dimethyl pyrrole
  Hydroxy—Acids—Saturated
    12-hydroxy stearic acid
    dihydroxy stearic acid
    diphenyl lactic acid
    Alpha, beta, gamma hydroxy acids
      α-hydroxy lauric
      α-methylpropionic acid
      β-hydroxy buteric acid
        Sulfur derivatives of hydroxy acids
          trithiodibutyro lactone
          β-dithio stearic acid
        Nitrogen derivatives of hydroxy acids
          α-hydroxy stearamide
          thiodiglycol imide
          γ-hydroxy myristyl nitrile
        Amino derivatives of hydroxy acids
          leucine
          α-amino stearamide
          aminopalmitic acid
        Dipeptides—Polypeptides
          leucyl pentaglycylglycine
    Hydroxy acids—Unsaturated
      hydrosorbic acid
      δ-phenyl-α-dimethylsorbic ethyl ester
    Aldehyde acids
      δ-aldovaleric acid
        Nitrogen derivatives
          formylbutyric acid
          phenyl hydrazone
    Ketonic acids
      parapyroracemic
      Saturated ketone carboxylic acids
        Alpha and beta ketonic acids
          beta dithioethyl stearyl ester
          butyryl butyric ester
          decanoyl acetic ester
          Nitrogen derivatives
            polymerized isobutyryl cyanide
            β-diaminocaproic ester
          Halogen substitution products
            α-dichlorostearic acid
            α-dibromomyristic acid
        Gamma and delta ketonic acids
          caproyl isobutyric acid
          Nitrogen and halogen derivatives
            β-d-dibromo levulinic acid
            phenylhydrazone mesitonic acid
      Unsaturated ketonic acids
        isopropylidene acetostearic acid esters
    Dicarboxylic acids
      Saturated
        azelaic acid
        diphenyl succinic acid
        dimethylpinetic acid
        brassylic acid
        Nitrogen derivatives
          sebasic hydrazide
          suberic diamide
        Halogen derivatives
          tetrachlorosuberic acid
          ω-bromostearic acid
        Other substituents
          thiophenylnonanedicarboxylic acid
          dithiophenylroccellate
      Olefin dicarboxylic acids
        allyl malonic acid
        dioctadecyl fumerate
        dibromo glutaconic acid
        α-diphenyl glutaconic acid V. Oxygen derivatives—Trihydric
   Trihydric alcohols
      glycerol homologs
      Inorganic and organic acid esters
         dibutyl glycerol phosphoric acid
      Glycerol ethers, esters, glycerides
         palmitodistearin
         triolein
         trimyristin
      Glycerol nitrogen derivatives
         lecithins
   Dihydroxy aldehydes
      pentaglycerol aldehyde
   Dihydroxy ketones
      dihydroxydecylmethyl ketone
      γ-pyrone
   Hydroxy dialdehydes
      lauryl chloromolonic dialdehyde
   Hydroxy diketones
      hydroxy methylene benzoyl acetone
   Dihydroxy carboxylic acids
      δ-hydroxy valero-lactone
      sym. dihydroxy azelaic acid
     Amino-hydroxy carboxylic acids
      α-amino thiolactic acid
   Monohydroxy dicarboxylic acids
      phenylstearyl maleic acid
      Hydroxy malonic acid
      Hydroxy succinic acids
   Aldo-dicarboxylic acids
   Keto-dicarboxylic acids
      d.keto-azelaic acid
         Uric acid—Ureides
   Tricarboxylic acids
VI. Polyhydric alcohols
   Carbohydrates, Celluloses
VII. Carbonic acid and Thiocarbonic acid
   ethyl thiocarbonate
   cetyl dithiocarbonate
   lauryl thiocarbimide
   Chlorine derivatives
      p. chlorobenzyl xanthate
   Sulfur derivatives
   Amide derivatives
   Urea, ureides, hydrazine, azines
   Sulfur derivatives of carbonic acid
   Sulfur derivatives of urea
   Guanidine and its derivatives
   Nitriles and imides of carbonic acid
   Cyanogen and oxygen derivatives of carbonic acid
   Cyanogen and halogen derivatives of carbonic acid
   Cyanogen and sulfur derivatives of carbonic acid
   Cyanuric acid—amides
VIII. Nitrogen Derivatives
   1. Amines, primary, secondary, and tertiary
      Phenyl alkyl amines
      Alkyl phenyl amines
      Poly phenyl amines
      Alkyl anilines
      Aniline inorganic acids
      Diamines and polyamines
      Phenyl nitrosamines
   2. Ammonium bases
   3. Nitro compounds
   4. Nitroso compounds
   5. Hydroxylamines
   6. Diazo compounds
   7. Azoxy compounds
   8. Azo compounds
   9. Hydrazine compounds
IX. P, As, Sb, Sn, Bi, B, Si compounds
   Phosphines, arsine, stibine compounds
      Halogen, hydroxyl, derivatives
   Phosphorous, arsenous, stannous compounds
      Halogen, sulfur hydroxyl, derivatives
   Phosphoric, arsenic, boric, silicic acid compounds
      Ortho, meta, pyro, acid derivatives
X. Metal compounds
   Metal alkyls, aryls
      Compounds of Zn, Mg, Sn, Pb, Na, Hg, and Ge
   Metallo-organic derivatives
XI. Sulfur compounds
   Mercaptans, thiophenols
   Sulfinic, sulfonic, and sulfuric acid derivatives
   Sulfides, disulfides, polysulfides
   Sulfoxides, sulfones
XII. Animal substances
   Proteins, albumens
   Amino and imino acids
      Hydroxy, thio derivatives
   Glucoproteins
   Phosphoproteins
   Enzymes, ferments
   Biliary products

*Heterocyclic compounds*

1. Ethylene oxide homologs
   Ethylene sulfide homologs
   Ethylene imine homologs
   Diazomethane homologs
2. Trimethylene, oxide, imine
   Betaines
   Methylene urea, methylene thiourea
3. Furan, thiophen, selenophen, pyrrole nuclei
   Halo, nitro, amino, and alkyl derivatives
   Alkyl-phenyl derivatives
   Alcohol, amine, aldehyde, acid derivatives
   Nitro, nitroso, oxy derivatives Preferred organic reactants for reaction with $P_xS_y$ reagents, such as $P_2S_5$ are:

Hydrocarbon compounds of olefinic character of the related non-olefinic compound, such as:

Alkenes = $C_nH_{2n}$
Wax olefins $C_{12}$ to $C_{30}$
Dodecene
Cetene, octadecene
Melene, etc.
Triisobutylene, polybutenes, polyisobutenes
Propylene polymers
Amylene polymers
Mixed $C_3$, $C_4$, $C_5$ olefin polymers
Styrene and polystyrene
Olefin-aromatic condensates such as the simple hydrocarbon or its hydroxide, halide, mercaptide, forming the reactive olefin by the removal of hydrogen, the elements of water, halogen, hydrogen halide, hydrogen sulfide, sulfur and the like;

High molecular weight natural and synthetic olefinic structures such as rubber, Buna-S, Buna-N, butyl, butyrone, isoprene, chloroprene, rubber-like products.

Olefinic hydroxy compounds
   oleyl alcohol
   p. hydroxy cinnamene
   methyl cyclohexenol
   2,4-dibutenyl phenol In the following table will be found listed a number of the usable phosphorus and sulfur containing reagents which may be caused to react with any of the organic compounds listed in Table I above in the preparation of the preferred type of intermediate or starting material as per broad class B previously identified.

TABLE II

PHOSPHORUS AND SULFUR CONTAINING REAGENTS

Phosphorus and sulphur compounds
   Compounds of phosphorus and sulphur alone
      Phosphorus disulfide—$P_3S_6$ (or $PS_2$)
      Phosphorus trisulphide—$P_4S_6$ (or $P_2S_3$)
      Phosphorus sesquisulphide—$P_4S_3$
      Phosphorus pentasulphide — $P_2S_5$ (or $P_4S_{10}$)
      Phosphorus heptasulphide—$P_4S_7$
   Compounds of phosphorus, sulphur and halogen
      Phosphorus thiochloride—$PSCl_3$
      Phosphorus thiobromide—$PSBr_3$
      Phosphorus thiobromide—$P_2S_3Br_4$
   Compounds of phosphorus, sulphur and oxygen
      Phosphorus sulphoxide—$P_4S_4O_6$
   Compounds of phosphorus, sulphur and elements other than oxygen or halogen
      Phosphorus thiocyanate—$P(CNS)_3$ Reagents containing elements equivalent to phosphorus and/or sulphur.

Compounds of phosphorus and equivalents of sulphur, e. g., Se, for example $P_2Se$
$P_2Se_3$
$P_2Se_5$ As representative examples of metal and sulfur containing reagents which may be caused to react with any of the phosphorus and sulfur containing organic compounds of Table I above, or any of the reaction products resulting from the reaction of any of the materials listed in Table II above with any of the reagents listed in Table III below, reference may be had.

TABLE III

Heavy metal compounds
    tin sulfide
    lead thiocarbonate
    tellurium sulfide
    chromium xanthate
    molybdenum sulfide
    tungsten sulfide
    nickel sulfide
    bismuth sulfide
    copper trithiocarbonate
Alkali metal compounds
    lithium sulfide
    lithium bisulfite
    sodium polysulfide
    sodium sulfite
    potassium trithiocarbonate
    potassium thiosulfate
    rubidium thiosulfate
    caesium sulfite
    potassium halo-metal sulfonates
    potassium seleno-cyanate
Alkaline earth metal compounds
    magnesium sulfite
    magnesium sulfate
    calcium sulfide
    calcium thiocyanate
    strontium sulfide
    strontium sulfite
    strontium hydrosulfide
    strontium thiocyanate
    barium sulfide
    barium trithiocarbonate
    barium hydrosulfide
    cadmium sulfide
    cadmium thiophosphate
    cadmium thiocyanate
    zinc sulfide
    zinc thiophosphate
Metallic sulfur compounds containing organic radicals
    Mercaptides
        sodium lauryl mercaptide
        potassium cetyl mercaptide
        copper oleyl mercaptide
        sodium diamyl-thiophenolate
    Disulfides and polysulfides
        potassium myronate
        sodium phenyl polysulfide
        potassium wax-phenyl polysulfide
        lithium ethyl polysulfide
    Thio carbonates
        potassium ethyl thiocarbonate
        zinc ethyl thiocarbonate
        sodium phenyl thiocarbonate
    Xanthates
        calcium cetyl xanthate
        sodium wax-phenyl xanthate
        potassium isobutyl xanthate
    Thiocyanates
        methyl thiocyanate
        ethyl thiocyanate
        isopropyl thiocyanate
        allyl thiocyanate
    Thiophosphates
        diphenyl zinc dithiophosphate
        methyl cyclohexyl sodium thiophosphate
        dicresyl barium thiophosphate
        sulfurized diamylphenyl thiophosphates
    Sulfites
        acetaldehyde potassium bisulphite
        formaldehyde potassium bisulphite
        benzaldehyde potassium bisulphite
    Sulfonates
        potassium myronate
        potassium halomethyl sulfonates
        sodium wax-phenyl sulfonate
        barium cetyl phenyl sulfonate
        sodium hydroxy methyl sulfonates The foregoing examples of organic compounds and reagents is illustrative of the use of the named compounds or their equivalent in producing the phosphorus and sulfur containing organic component of the addition agent of this invention. These illustrations involve the use of reagents containing both phosphorus and sulfur either alone or with other elements. It is fully within the scope of the invention to use either phosphorus or sulfur containing organic compounds either naturally occurring or synthetic, as in Class B above, to combine with the alternate either phosphorus or sulfur containing reagent to produce a phosphorus and sulfur containing organic compound capable of forming a metal derivative and coming within the scope of the broad classification set up above under "B." The methods of preparing such additive compounds for further elaboration are illustrated by the following:

A. Organic sulfur compounds combined with phosphorus bearing agents, such as elemental phosphorus,
    $PCl_3$, $PCl_5$, $PSCl_3$,
    $P_2O_5$, $POCl_3$
    reacted with:
        Mercaptans, thiophenols
        Thioethers, R-disulfides, polysulfides
        Thiophene, thiophanes
        Alkylated phenol sulfides
        Thioacids, esters, aldehydes
        Thiocarbonates, xanthates, thioformates
        Thiolic anhydrides, thio-amino-acids B. Organic phosphorus compounds with sulfur bearing reagents, as
    Elemental sulfur, $CS_2$, $COS$, $S_2Cl_2$, $SCl_2$, $CSCl_2$
    $P_2S_3$, $P_2S_5$, $P_3S_4$,
    reacted with:
        Alkyl and aryl phosphates, phosphites
        Phosphonic acids, esters and salts
        Phosphinic acids, esters and salts
        Organic phosphines
        Organic phosphine halides
        Lecithin, cephalin, phospholipides, phosphoproteins Among the various organic materials listed for example in Table II above, which may be utilized in the preparation of the phosphorus and sulfur containing intermediate, unusually desirable results will be secured when utilizing organic compounds having a molecular weight of the order of 300. While the molecular weight of 300 or thereabout is particularly preferred because of its oil solubilizing characteristics, other compounds having molecular weights ranging from roughly 150 to 1,000 or more may be used as desired.

Essentially paraffinic hydrocarbons such as bright stocks, residuums, lubricating oil distillates, wax distillates, petrolatums, or paraffin waxes may be used. Certain synthesized higher alkylated aromatics may similarly be used in effecting the desired compositions. In order to bring the paraffinic material into a reaction condition, it is frequently necessary to effect a preliminary reaction such as halogenation of the hydrocarbon with subsequent dehalogenation to produce the preferred unsaturated and reactive material. Similarly, the halogenated hydrocarbon may be condensed or combined with olefinic or unsaturated compounds, for example of the cyclic structure, by condensing agents such as anhydrous metallic halides, aluminum chloride, zinc chloride, ferric chloride, boron fluoride, and the like.

To effect the particularly preferred phosphorus sulfide-olefin reaction product, a hydrocarbon of uniform olefinic composition is chosen. Such a compound may be a pure olefin, obtained for example by dehydrating a higher alcohol, such as a cetene, melene, dodecene, and the like. Similarly, olefins of uniform composition obtained by the halogenation of petroleum wax stock and subsequent dehydrohalogenation are highly efficacious in producing the desired phosphorus sulfide compositions. I prefer particularly to employ a uniform composition olefin product having at least 20 carbon atoms in the molecule of which at least 15 or more carbon atoms are in a straight chain structure. Such olefins are preferably obtained by the halogenation of long chain wax compositions and the subsequent dehydrohalogenation of the halogenated products obtained. In the preparation of the preferred phosphorus sulfide olefin compositions, it is recognized that the mono-olefins react differently from the di- and poly-olefins. The compositions I particularly prefer are the mono-olefinic compounds such as are obtained by the halogenation of waxes to produce an essentially mono-halogenated wax, followed by the dehydrohalogenation of such a product, or the essentially pure mono-olefins obtained from mono-halogenated wax separated from the total halogenated product by fractionation followed by the splitting out of a hydrogen halide and the formation of an olefinic long chain molecule of uniform structure.

By way of example but not by way of limitation, I shall describe the method of obtaining my addition agents from a low melting point wax of from 18 to 24 carbon atoms per molecule. The wax is halogenated to a halogen content of from 8 to 12 per cent. The preferred halogen is chlorine. The crude halogenation mixture will comprise some unchlorinated wax, mostly monochlor wax and some more highly chlorinated waxes. Chlorination of wax lowers its melting point stepwise inversely as the degree of chlorination. A monochlor wax will melt lower than the like unchlorinated wax. A di-chlorinated wax will have a lower melting point than the monochlor wax. The unchlorinated wax may be separated readily from the crude chlorination mixture by melting point differences, using sweating, or selective solvent extraction at various temperatures.

A solution of the crude chlorination mixture may be formed with acetone. At about 70° F., the chlorinated waxes will be in solution, while the unchlorinated wax will not dissolve and may be separated by settling, centrifuging, or filtering. The solution may be chilled to precipitate the monochlor wax. Thus the monochlor wax may be separated from the polychlor wax employing the same methods as those outlined for separating unchlorinated wax from the chlorinated wax mixture.

The monochlor wax thus obtained is substantially free of unchlorinated waxes or more highly chlorinated waxes and may be converted to the corresponding olefin by removing the chlorine as hydrogen chloride, thus producing a double bond. To prepare the olefin, the monochlor wax may be heated for a period of from one minute or less to five hours, with one tenth of its weight or more of lime, at temperatures between 200° F. and 550° F. The olefin may be formed by removing the hydrogen chloride by heat alone or by other reagents or processes, although the color of the resulting olefin may be darker than when lime is used. After dehydrohalogenation, the lime or other basic dehydrohalogenating agent is removed from the resulting olefin by the usual means, such as by filtering.

The theoretical iodine value for an olefinic hydrocarbon having the formula $C_{25}H_{50}$ is 72.6. The iodine value of the olefin prepared as described is about 72.

It should be pointed out that the olefin made as described is a definite type of compound having the structure:

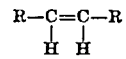

When prepared from a paraffin wax, "R" is an aliphatic group containing from 1 to about 20 or more carbon atoms. The sum of the two R's should be between 10 and 60 carbon atoms. When the olefin is prepared from a wax, a high-boiling mineral oil, or mixture of wax and mineral oil, a specific type of structure is always obtained. In phosphorus-sulfurizing this type of compound, the $P_xS_y$ reagent adds on to the double bond and is not substituted for hydrogen, as is shown by the fact that in the $P_xS_y$ reaction practically no $H_2S$ is formed. This fact makes it possible to prepare a definite type of compound in contrast to the heterogeneous mixture which is obtained when a saturated material, a cracked petroleum derivative, or a polymerized olefin containing many types of unsaturates is treated. The advantages of the former, due to its purity and homogeneity of composition, are many.

As an indication of the manner by which a phosphorus and sulfur containing intermediate, useful in the manufacture of the products of my invention by the further reaction therewith of a metal and sulfur containing reagent may be prepared, reference may be had to the following example.

EXAMPLE I

One hundred parts of the olefin prepared as described above are chemically combined with from 6 to 30 parts of phosphorus sulfide, preferably from 12 to 24 parts of phosphorus pentasulfide. This is accomplished by heating and stirring the olefin with increasing temperature until a temperature of about 200 to 250° F. is attained. In this temperature range the first quantities of phosphorus sulfide are added. This early addition of phosphorus sulfide is a precautionary measure to preclude polymerization of the olefin. Thus, as the olefinic double bond becomes more reactive with increasing heat, the phosphorus sulfide will add thereto instead of permitting an olefin polymerization to take place. Heating and stirring are continued with additional increments of phosphorus sulfide until a temperature of approximately 340 to 360° F. is attained. By this time the phosphorus sulfide has begun to react thoroughly, and all the phosphorus sulfide should have been added. The temperature is maintained in this range of 350° plus or minus 10° F., until the phosphorus sulfide has apparently gone into thorough and complete solution. This is accomplished with active stirring in from 10 to 30 minutes. Under certain conditions, however, longer periods of time may be required. Additional beneficial effect is obtained if an inert atmosphere is maintained over the reacting olefin mixture, such as by maintaining a dry gas ($CH_4$) atmosphere or a nitrogen atmosphere over the reacting mass. The reaction with phosphorus pentasulfide is quite rapid, and almost immediately the olefin-phosphorus sulfide product has the sulfur firmly bound, such that a solution of the reaction product in a light hydrocarbon does not give a copper strip positive test. The phosphorus sulfide-olefin product may be cooled and discharged at once; however, it has generally been found desirable to continue the heating period with an inert atmosphere over the reaction mass with stirring for approximately ½ hour, in order to insure a complete reaction of the phosphorus sulfide, both of the phosphorus sulfide not completely in solution and of the phosphorus sulfide in physical solution in the olefin or olefin-phosphorus sulfide product. The product resulting from the foregoing reaction may be refined by blowing with an inert gas, for example, to improve the odor of the product, by treating with active clays to improve the color of the product, and/or by treating with chemical clays such as caustic impregnated clays to improve the color of the product and at the same time remove a small quantity of the reactive material which apparently causes sludge formation. It has been found particularly desirable to treat the crude phosphorus sulfurized product with a neutralizing agent such as fuller's earth or the equivalent, such as bauxite, lime, or caustic at temperatures between 200 and 300° F. for such a period of time as is necessary to effect a partial reduction in the free acidity usually found in the crude phosphorus sulfurized olefin product.

As will be pointed out hereinafter in greater detail, one feature of the present invention is the extremely high concentration of sulfur in the end products which are especially desirable for use as lubricant improving agents, and the retention of substantially all of such sulfur content, comprising 80% or more of the S:P ratio in the $P_xS_y$ reaction product, in the preparation of the metal derivative which comprises the end product. In certain instances where the sulfur concentration in the intermediate, i. e. the phosphorus and sulfur containing organic compound which is reacted with the metal and sulfur containing reagent is not at the theoretical maximum, then the latter reagent may actually contribute sulfur in addition to metal to the end product.

I am aware of the fact that certain prior art workers have prepared phosphorus and sulfur containing organic compounds by the reaction of an unsaturated organic compound with a phosphorus and sulfur containing reagent and such materials have been proposed for use as lubricant improvers. Materials of that character are, however, highly acidic and it has accordingly been proposed also to reduce the acidity of such acidic materials by means of alkali hydroxides and the like. The neutralization or partial neutralization when accomplished by the use of a hydroxide, oxide or carbonate or even certain metal sulfides removes a very substantial amount of the sulfur from the phosphorus sulfide reaction product, and to the extent that sulfur is thus removed, the product is rendered less effective and less desirable.

I have discovered that a high content of metal may be introduced and a high content of sulfur maintained in the compound, producing a composition having outstanding thermal stability, storage stability, oil solubility and detergent properties in addition to the desirable characteristics heretofore disclosed, if the metal derivatives are prepared in a prescribed manner by the action of the metal and sulfur containing reagents listed above either in solid form, as hydrated solids, or as aqueous or aqueous-alcoholic solutions. The metals whose sulfur compounds are most active in this connection are the alkali metals and alkaline earth metals. Other metals may be used as sulfides, polysulfides, thiocarbonates, xanthates, etc. However, I prefer the active alkalies and alkaline earths, such as sodium, potassium, lithium, calcium, barium, magnesium, strontium, etc. as sulfides, hydrosulfides, polysulfides and the like. By this means I have succeeded in preparing oil soluble phosphorus sulfide hydrocarbon products, such as PS-Olefin compounds, having up to six equivalents of metal combined; however, derivatives with from 1 to 3 equivalents are preferred, per molal unit of $P_2S_5$. For example, I have prepared oil soluble, stable, alkaline, non-turbid compounds having the empirical composition $Na_6R_3P_2S_5$, using sodium sulfide as a reagent, wherein the high metallic content is apparently in complete organic combination and the sulfur content is essentially in agreement with the formula shown and not appreciably reduced as would invariably be the case in the preparation of a similar type of compound from caustic soda NaOH, or as would generally be the case when an aqueous-sulfide solution were used as a reagent.

It is often desirable to prepare and use heavier or polyvalent metal derivatives such as the aluminum, indium, tin, titanium, chromium, copper, lead or other metal derivatives in lubricating compositions. When such a derivative is not available by the direct reaction of the metal sulfide, polysulfide, etc. with the PS reaction product, the compound can be prepared by metathesis with the available alkali metal derivative. By reacting a salt of the desired heavy or polyvalent metal with the sodium derivatives, for example, the particular heavy metal derivatives may be prepared without substantial change in the content of combined sulfur.

The preparation of the high sulfur content metal derivatives of PS organic reaction products, as illustrated in the following examples, is preferably carried out at temperatures in the range of 200–300° F. in an inert atmosphere and under pressure to avoid $H_2S$ loss, using the hydrated crystalline solid compounds, the finely divided non-hydrated solids, or, less preferably, concentrated solutions of the metallic reagent in order to effect the formation of metal derivative in a short time and with a minimum or controlled hydrolysis and little or no $H_2S$ loss. Long periods of heating over several hours, particularly above 250–300° F. with water present, are detrimental to the composition and are to be avoided. By way of illustration and not by way of limitation the following examples are presented:

EXAMPLE II

One molal part of PSO–21 having a neutralization number of 2–4, the reaction product obtained on combining 21 parts by weight of $P_2S_5$ with 100 parts of olefin prepared as described in Example I, mixed with an equal weight of light oil as a diluent and containing 2 cc. of a silicone oil solution as an anti-frothing agent is heated and stirred in a sealed vessel to 200–230° F. in an inert gas ($N_2$, $CH_4$, etc.) atmosphere and 20 pounds pressure. 0.5 mole of sodium sulfide nonahydrate ($Na_2S.9H_2O$) is heated and dissolved in its hydrate. The sodium sulfide solution is added to the reaction system at about 220–230° F. No dangerous frothing or loss of material either liquid or gas, is encountered due to the action of the anti-frothing agent present. The temperature is quite rapidly raised to 300° F. The reaction product is a clear dark liquid which is filtered through paper and recovered as a clear oil-soluble material. The total time of reaction is of the order of 30 minutes. If the heating is protracted and if large quantities of aqueous solution are used the product may have a higher titratable acidity after the reaction than before. By the method outlined, the product has a low titratable acidity or may have excess alkalinity. The product thus prepared has been analyzed and tested as further shown below.

EXAMPLE III

Using the quantities of PSO–21, diluent and anti-frothing agent as shown in Example II, one molal quantity of sodium sulfide-hydrate is added directly at 200–230° F. This preparation has the further advantage that no excess water is added. Under the conditions of reaction (200–300° F.) the hydrate dissociates liberating water which is in intimate association with both the metal derivative forming molecule ($Na_2S$) and the hydrolyzable and reactive PSO compound such that the metal derivative is formed readily with a minimum of sulfur loss and a minimum of developed free acidity. The reaction mass is heated, over a period of about one-half to one hour, to 300° F. and the product clarified by centrifuging or by filtration through paper. This oil soluble product is further described below.

EXAMPLE IV

One molal quantity of PSO–21 as described above in Example II, diluted with an equal weight of diluent oil and containing approximately one part per thousand of silicone oil solution as an anti-frothing agent is heated and stirred in an atmosphere of nitrogen gas at 10 pound pressure to about 200° F. One molal part of sodium thiocyanate, NaCNS dissolved in 15 cc. of boiling water is added at 200–250° F. or thereabout. Water appears to be retained in the reaction mass to about 300° F. in which range water is eliminated as a vapor. The product is clarified by centrifuging and/or filtering. The oil solution of this additive is bright and clear. Further tests are described below.

EXAMPLE V

With sodium sulfide as a reagent, the metal derivative of the compound prepared in accordance with Example VI has been prepared in which the sulfur and phosphorus sulfide-methyl ricinoleate reaction product diluted with an equal weight of a light oil has been brought into reaction with the sodium sulfide hydrated crystals at temperatures between 200 and 250° F. for a period of from ½ to 1 hour. The resultant product has shown a very minute diminution in sulfur content, corresponding to not over $2/10$ per cent on the basis of the analyses, which values are well within the range of probable error in the method of analysis for sulfur combined in such organic additives. The sodium derivative of the diluted sulfur and phosphorus sulfide-treated methyl ricinoleate showed a 4.2 per cent ash value which corresponds to 1.37 per cent of sodium which indicates that approximately ¼ of an atom of sodium has combined with the sulfur and phosphorus sulfurized methyl ricinoleate to form a compound having approximately the composition $NaR_4S_4P_2S_5$. Blends of this metal derivative in a 170 pale oil showed a high thermal stability and gave clear stable solutions in the oil. While the phosphorus sulfide and sulfur-treated methyl ricinoleate product when blended in an oil produced a sludge in 16 hours at 325° F. and a depreciation in optical density of 624, the above-described sodium derivative in a 1 per cent blend gave a clear light oil with no sludge after 16 hours at 325° F., which oil showed an optical density depreciation of only 140.

The compounds prepared as illustrated above have retained their sulfur content to a major degree and within the range of 80% or more of the original S:P ratio, and on extended treatment with the metal sulfur-containing compounds, have regained the modest initial losses of combined sulfur.

Analysis of PSO–21C and sodium-sulfide derivatives

[Prepared according to Example II]

| | Percent Sulfur | Percent Ash | Atomic Quant. Na Found |
|---|---|---|---|
| SERIES A | | | |
| PSO 21–C | 15.8 | 0.37 | 0 |
| PSO 21–C–Na₁/Na₂S | 11.7 | 7.0 | 1.17 |
| PSO 21–C–Na₂/Na₂S | 13.0 | 13.4 | 2.3 |
| PSO 21–C–Na₃/Na₂S | 14.0 | 14.5 | 2.6 |
| SERIES B | | | |
| PSO₂ 21–5 | 8.67 | 0.6 | 0 |
| PSO 21–5–Na₁/Na₂S | 6.01 | 4.79 | 1.4 |
| PSO 21–5–Na₂/Na₂S | 6.31 | 6.66 | 2.2 |
| PSO 21–5–Na₃/Na₂S | 6.79 | 9.58 | 3.3 |
| PSO 21–5–Na₃/NaOH | 5.21 | | |

This demonstration of sulfur maintenance and sulfur build-up with metal sulfides is to be contrasted with the loss shown on forming the $Na_3PSO\ 21$ derivatives from aqueous or alcoholic NaOH or the like.

A more striking demonstration is of the action of the metal sulfur compounds with no free water in the formation of superior additives of the metal-PSO type, in which the sodium derivatives prepared from NaOH and from $Na_2S$ are compared on a series of compounds synthesized under identical time and temperature conditions as shown in Example II.

| | Neut. No. | Percent SO₄ Ash | Atomic Quant. Sodium Found |
|---|---|---|---|
| PSO₂ 21 | 2.0 | 0.6 | 0 |
| PSO₂ 21 1 Na/NaOH | 4.4 | 4.17 | 1.2 |
| PSO₂ 21 1 Na/Na₂S | 2.0 | 4.79 | 1.4 |
| PSO₂ 21 2 Na/NaOH basic | 1.8 | 6.65 | 2.3 |
| PSO₂ 21 2 Na/Na₂S basic | 4.5 | 6.66 | 2.2 |

It is clearly shown that the extent of metal derivative formation is practically equivalent when using the metal sulfides or the hydroxides, however the advantage of lower free acidity or higher alkaline reserve is regular and pronounced in the water-free sodium sulfide series. This excess alkalinity is a clear and desirable advance in the compounds of my invention.

Underwood tests carried out under conditions of accelerated corrosion more fully establish the superiority of the metal PSO derivatives prepared from the sulfur containing metal compounds. In these tests the oil is subjected to the Underwood test conditions plus:

(1) Progressive addition of corrosion accelerator (soluble lead naphthenates) equivalent to .025 per cent of lead as PbO every 2½ hours, (2) The injection of air over the hot oil bath at the rate of ½ cu. ft./min.

*Underwood data*

In the compositions below, the base to which the stated percentages of the identified materials were added consisted in each case of an SAE 20 Mid-Continent base solvent refined oil plus 0.5% methyl dichlor stearate.

1. 2.50 per cent blend of reference additive, PSO 21–C, or metal derivative of PSO 21–C equivalent to 0.15 per cent added theoretical sulfur.

|  | Induction Time, Hours | | Corrosion Loss Cu-Pb | | | (Time in Hrs.) Cd-Ag | | |
|---|---|---|---|---|---|---|---|---|
|  | Cd-Ag | Cu-Pb | 10 | 15 | 20 | 10 | 15 | 20 |
| A. PSO 21–C | 15.0 | 15.0 | 0 | 0 | 0.9 | 0 | 0 | 2.75 |
| B. PSO 21–C-Na1/NaOH | 14.0 | 15.0 | 0 | 0 | 0.8 | 0 | .25 | 2.55 |
| C. PSO 21–C-Na1/Na₂S | 20.0 | 19.5 | 0 | 0 | 0.2 | 0 | 0 | 0.1 |
| D. Sulfurized Olefin | 12.0 | 12.5 | 0 | 0.6 | 1.65 | 0 | 1.5 | 4.5 |

2. 1.25 per cent blend of PSO–21–D or metal derivative of PSO–21–D equivalent to 0.075 per cent added sulfur.

|  | Induction Time, Hours | | Corrosion Loss Cu-Pb | | | (Time in Hrs.) Cd-Ag | | |
|---|---|---|---|---|---|---|---|---|
|  | Cd-Ag | Cu-Pb | 10 | 15 | 20 | 10 | 15 | 20 |
| A. PSO 21–D | 14.0 | 12.0 | 0 | 0.2 | 1.4 | 0 | 1.2 | 3.15 |
| B. PSO 21–D-Na1/NaCNS | 13.0 | 12.0 | 0 | 0.3 | 0.92 | 0 | 1.0 | 2.35 |
| C. PSO 21–D-Na1/Na₂S | 14.5 | 14.0 | 0 | 0.1 | 1.2 | 0 | 0.25 | 2.70 |
| D. PSO 21–D-Na2/Na₂S | 14.0 | 15.0 | 0 | 0.2 | 1.2 | 0 | 0.15 | 2.50 |
| E. PSO 21–D-Na3/Na₂S | 14.0 | 15.0 | 0 | 0.1 | 0.9 | 0 | 0 | 1.83 |

It is evident from the tabulated data that the sodium sulfide hydrate derivatives are markedly superior to the sodium hydroxide derivatives and far superior to the PSO materials alone as metal deactivators and corrosion inhibitors. The metal derivatives obtained from sulfur containing radicals generally show a real improvement as corrosion inhibitors. The results here show a new high order of activity when the results are compared with a commercial inhibitor (sulfurized olefin) considered a superior product in its field. When one considers that marketed commercial lubricating oils show a 7½–10 hour induction time on this test, the outstanding effect of the preferred metal-PSO derivatives becomes pronounced. Thus, with as little as .038 per cent added sulfur as the preferred Na₂S-PSO derivative the resultant oil blend has an induction time equivalent to that produced by 0.15 per cent sulfur as sulfurized olefin, the reference anti-corrosion additive.

These metal derivatives of the PS-hydrocarbon have outstanding thermal stability. Blends of the metal PS-hydrocarbon additives in oil remain clear and bright on exposure to sunlight over a long period of time whereas PS-hydrocarbons alone become turbid in from 2 to 45 hours. On exposure to temperatures of the order of 325° F. for 16 hours or longer, the PS-hydrocarbon blends sludge badly, giving a dark oil and depositing a tenacious black gum on the containing vessel. With these metal derivatives, not only is a clear stable solution obtained in oil, but the solution is also outstandingly stable to the high temperature thermal test—no sludge or gum is formed from our blends in which an appreciable amount of metal is bound in the molecule and very little color depreciation is observable after the 16 hours test. This characteristic of high thermal stability is clearly a mark of an additive of outstanding value for the present high temperature, high speed engine lubricants. The compounds of particular value in this regard are the metal-PS-hydrocarbon derivatives having a high sulfur content such as have been illustrated above as being prepared by the prescribed action of metal sulfides, hydrosulfides, polysulfides and sulfur containing organic compounds on the PS-organo reaction product.

In order to establish a reproducible and factual measure of this outstanding characteristic of high thermal stability, I have prepared 1 per cent blends of the additives in a light (170 pale) Mid-Continent solvent treated oil which is sensitive to oxidation. The color value or optical density of the sample is determined on the Klett-photoelectric colorimeter using the green filter #54 and setting the value of the neutral 170 pale oil alone as zero. The color value is taken of the additive blend before thermal treatment and after given intervals of exposure at 325° F. in a constant temperature oil bath. The increase in concentration of color bodies or the change in optical density on thermal tests is a progressive measure of the breakdown (sludging) tendency of the oil blend, and is far more sensitive and rapid than the Underwood Test.

*Color depreciation on thermal test*

| Time at 325° F. Hours | Color Value (Optical Density) | | Change in Optical Density | Sludge |
|---|---|---|---|---|
|  | 0 | 16 | | |
| SERIES A | | | | |
| PSO 21–C/2 | 90 | 1,000+ | 1,000+ | yes. |
| PSO 21–C Na1/Na₂S/2 | 70 | 236 | 166 | no. |
| PSO 21–C Na2/Na₂S/2 | 60 | 84 | 24 | no. |
| PSO 21–C Na3/Na₂S/2 | 61 | 89 | 28 | no. |
| SERIES B | | | | |
| PSO 21–5/2 | 122 | 520 | 398 | yes. |
| PSO 21–5 Na1/Na₂S/2 | 87 | 187 | 100 | no. |
| PSO 21–5 Na1/NaCNS/2 | 102 | 720 | 618 | no. |

| | Optical Density Values after —— hours at 325° F. | | | | | | | |
|---|---|---|---|---|---|---|---|---|
| | 0 | 16 | 32 | 48 | 64 | 80 | 96 | 112 |
| *Series C* | | | | | | | | |
| $\frac{PSO\ 21\text{-}5}{2}$ | 122 | *520 | **1,200 | ------ | ------ | ------ | ---- | ---- |
| $\frac{PSO\ 21\text{-}5}{2}$ Na1/Na₂S | 84 | 103 | 720 | *1,575 | **2,000 | ------ | ---- | ---- |
| $\frac{PSO\ 21\text{-}5}{2}$ Na1/NaOH | 92 | 195 | *1,000 | *1,920 | ------ | ------ | ---- | ---- |
| $\frac{PSO\ 21\text{-}5}{2}$ Na2/Na₂S | 85 | 113 | 217 | 355 | 855 | *1,405 | ---- | ---- |
| $\frac{PSO\ 21\text{-}5}{2}$ Na2/Na₂S(a) | 91 | 117 | 222 | 350 | 815 | *1,245 | ---- | ---- |
| $\frac{PSO\ 21\text{-}5}{2}$ Na2/NaOH | 86 | 127 | 250 | *990 | *2,075 | ------ | ---- | ---- |

*Sludge formed and test terminated.
(a) Following the preparation of Example III.

It is clearly demonstrated above that the derivatives prepared from metal and sulfur containing compounds have a uniformly better initial color than the PS-hydrocarbon product and quite generally a better color than the similar derivative prepared from NaOH. Whereas the PSO blends are sludged heavily in less than 16 hours at a color value as low as 500, the metal derivatives and particularly the high sulfur metal derivatives show unusual color stability (slight change in optical density) and outstanding resistance to sludging. The color stability increases with increasing metal content. The particular superiority of the metal sulfide series over the comparable metal hydroxide derivatives is shown in the Series C tests above. While the PSO base blend was sludged at 16 hours, the Na₁ series was stable through 32 hours for Na1/NaOH and through about 48 hours for Na1/Na₂S, and the Na₂ series was stable through 48 hours for 2Na/NaOH and through 80 hours for 2Na/Na₂S prepared according to Example II and even more stable, through 80 hours, as prepared according to Example III from the crystalline hydrates. This is recognized as a characteristic of the metal-PSO derivatives in which excess alkalinity or alkaline reserve is present. Since I have shown above that the metal sulfur-containing compound and particularly the reaction of the hydrated form is particularly effective in producing such excess, or reserve alkalinity, such compounds are illustrative of the particularly preferred forms of the invention.

A number of the preferred additives prepared according to the methods shown above and having a high combined sulfur content due to the prescribed action of metal sulfur containing reagents on the phosphorus and sulfur containing intermediates in forming the metal derivatives and qualifying as a preferred additive contributing a high thermal stability to oil blends containing them as measured by the above described and other qualifying tests have been subjected to mechanical tests in full scale engines as follows:

1. 5,000 mile tests in Chevrolet and Pontiac engines at high temperatures under the following engine conditions:

Oil Sump Temp., °F_____ 260
Jacket Water Outlet_____ 185
Jacket Water Inlet_____ 175
Speed, R. P. M_____ 2750
Load, H. P_____ 19
Fuel_____ 76 octane, 2.5 ml. TEL/gal.
Duration _____ 5000 miles for breakdown The base oil is a blend of Mid-Continent solvent treated stocks SAE 20 grade with 0.4 per cent methyl dichlorstearate added as an oiliness agent.

| Additive | Per Cent Added Sulfur | Test Engine | Demerit Rating | Corrosion Wt. Loss | Tenths Rings Stuck |
|---|---|---|---|---|---|
| Sulfurized olefin | 0.15 | Chev. | 20.0 | 1.55 | 0 |
| | | Pontiac | 25.0 | | 7 |
| Sulfurized fatty acid ester | 0.15 | Chev. | 22.5 | 0.90 | 0 |
| | | Pontiac | 35 | | 48 |
| PSO21-Na₂S Stabilized | 0.15 | Chev. | 19.5 | 0.02 | 0 |
| | | Pontiac | 18 | | 0 |
| PSO21-Na2.0 | 0.15 | Chev. | 17½ | 0.02 | 0 |
| | | Pontiac | 16 | | 0 |
| Do | 0.25 | Chev. | 15 | 0.08 | 0 |
| | | Pontiac | 13 | | 0 |

2. 67 hour Chevrolet heavy-duty runs under the following conditions:

Oil Sump Temp., °F_____ 280
Jacket Water Outlet °F_____ 200
Jacket Water Inlet_____ 190
Engine R. P. M_____ 3,150
Load H. P_____ 30
Hours _____ 67
Fuel _____ 74.2 octane, 2.5 ml. TEL/gal.
Lubricant _____ SAE 20 min. oil+0.4 MDS (The base oil is an SAE 30 grade blend of Mid-Continent solvent treated stocks plus 0.4 per cent methyl dichlor-stearate as an oiliness agent).

| Additive | Per Cent Sulfur | Per Cent Additive | Demerit Rating | Corrosion Wt. Loss | Ring Gap Wear |
|---|---|---|---|---|---|
| A. PSO21-Na₂S stabilized | 0.25 | 4.25 | 14 | 0.160 | 0.010 |
| B. S44*1 | | 2.50 | 13 | 2.110 | 0.020 |
| C. P56*2 Sulf. Olefin | 0.25 | 2.15 / 4.20 | 14.5 | 0.209 | 0.010 |
| D. S44*1 Sulf. F. acid ester | 0.15 | 2.5 / 2.5 | 15 | 1.532 | 0.006 |
| E. 244*1 Sulf. F. acid ester | 0.25 | 2.5 / 4.20 | 13 | 0.068 | .006 |
| F. P 105*3 Sulf. olefin | 0.25 | 2.9 / 4.20 | 17 | 0.150 | .005 |
| G. P 105*3 Sulf. f. acid ester | 0.25 | 2.9 / 4.2 | 17 | 0.122 | .008 |
| H. P 105*3 | | 2.9 | 15 | 1.45 | .005 |

*1 Commercial antioxidant—detergent recommended for heavy duty use at 2.5 per cent.
*2 Commercial—detergent recommended for heavy duty use at 2.15 per cent.
*3 Commercial antioxidant recommended for heavy duty use at 2.9 per cent.

It is clear that the preferred polyfunctional additive of my invention gives greater corrosion protection and higher detergency than the reference additives which include, among other combinations, combinations of commercial antioxidant and detergent additives. The mechanical condition of the test engines is important, both detergency and bearing corrosion are accurately evaluated in the diversified mechanical systems used.

However, a further significant qualification of the lubricant is in the condition of the oil drained from the engine at the end of a test run. A poor lubricant oil is markedly deteriorated and has left a dirty, corroded engine. Certain detergent-type oils are generally mildly corrosive such that the engine is clean, the dirt and corrosion products dispersed and carried away, leaving an unsludged and generally mildly corroded engine. An oil having antioxidant properties and metal deactivating properties may show excellent oil stability, but the engine is prone to be dirty. Now with a single multifunctional additive which is effective in detergent and antioxidant action, engine results have been obtained which are outstanding for engine cleanliness, low corrosion and low wear and simultaneously producing a used oil which has been but slightly deteriorated in use.

The following table presents the analytical data on typical used oils drained from the test engines after the 5,000 mile runs, showing:

1. Neutralization number as a measure of the acidity developed in the oil during the period of use, 2. Resin content as a measure of the build-up of hydrocarbon oxidation products in the oil during use, 3. Viscosity increase as a measure of the build-up of higher molecular weight condensation or polymerization products and/or suspended solids from fuel or lubricant, 4. Iron content as a measure of the extent of corrosion of the engine parts during use.

Each of these criteria is of value in assaying the oil; the combined tests serve as a rather critical survey of the degree of deterioration of the lubricant oil.

*Analysis of used engine oils from 5,000 mile runs at 260° F.*

(SERIES 1, ABOVE)
[Base oil = SAE 20 Mid-Continent solvent treated mineral oil plus 0.4 per cent methyl dichlor-stearate.]

| Additive | Engine | Neut. No. | Per Cent Resin | 210° F. Vis. Incr. | Per Cent Iron |
|---|---|---|---|---|---|
| Sulfurized olefin 0.15% S | Chev | 7.4 | 20.3 | 26.9 | 0.102 |
| | do | 6.4 | 21.0 | 22.9 | 0.137 |
| | Pontiac | 7.4 | 20.4 | 146.5 | 0.11 |
| Sulfurized fatty acid ester 0.15% S. | Chev | 4.2 | 17.5 | 45.2 | 0.07 |
| | do | 4.4 | 13.1 | 16.3 | 0.07 |
| | Pontiac | 7.0 | 19.4 | 69.5 | 0.18 |
| Sodium stabilized PSO-21¹ 0.15% S. | Chev | 1.0 | 4.5 | 4.9 | 0.03 |
| | do | 2.0 | 5.3 | 7.0 | 0.04 |
| | Pontiac | 3.3 | 8.3 | 13.2 | 0.07 |
| PSO-21-Na2.O 0.15% S | Chev | 4.2 | 5.0 | 6.0 | 0.05 |
| | do | 5.5 | 5.3 | 5.7 | 0.04 |
| | Pontiac | 7.7 | 6.7 | 10.8 | 0.03 |
| PSO-21-Na2.O 0.25% S | Chev | 4.3 | 2.0 | 3.0 | .05 |
| | do | 6.3 | 4.7 | 8.0 | .05 |
| | Pontiac | 6.1 | 6.1 | 10.4 | .02 |

¹ Prepared from Na₂S and having at least a minimum passing stability test as shown above.

In every category of comparison the used oil containing an additive within the scope of the present invention shows marked superiority to the reference oils. Together with the engine ratings shown above, the data demonstrate a new high order of activity as detergents and antioxidants for the preferred polyfunctional additive having a high sulfur:phosphorus ration of this invention.

In practically every lubricant application the oiliness or load carrying capacity of the lubricant is of high import. The lubricant oil blends containing the stabilized metal derivatives of phosphorus sulfide treated hydrocarbons prepared by the action of the preferred metal and sulfur containing reagents have shown high oiliness and load carrying capacity. For example, an SAE 20 mineral oil having no additive showed a pressure wear index on the "Shell 4-ball" tester of 2.8 and a "seizure load" value of 28 pounds, while this same base oil containing 0.15 per cent added sulfur as the sodium (Na₂S) stabilized phosphorus sulfide olefin product had a pressure wear index of 6.1, an increase of 3.3 and a seizure load of 60 pounds, an increase of 32 pounds, demonstrating the desirable lubricant improving characteristics of the preferred additive.

The foregoing examples illustrate the preparation of materials having high sulfur content comprising the metal derivatives of phosphorus sulfide treated hydrocarbons, particularly phosphorus sulfide treated wax olefin, in which preparation a high sulfur content is maintained at the phosphorus sulfide reactant ratio or near (within 80% of) that value by the action of organic or inorganic metallic sulfides, polysulfides, and the like in forming the metallic derivatives under conditions of minimal hydrolysis and $H_2S$ loss. The type of reaction by which a high sulfur content is maintained in the reaction products of a phosphorus sulfide treated material of organic origin for which it is desired to form a metal derivative may be applied to products other than the phosphorus sulfide-olefin or even to other than the phosphorus sulfide treated simple hydrocarbons of aromatic, cycloparaffinic or paraffinic nature. For example, the phosphorus sulfide reaction products with aliphatic alcohols or aromatic alcohols comprising the phenolic-type compounds are similarly highly benefited by the use of the metallic sulfur-containing compounds as reagents in forming the metallic derivatives, by which means the original sulfur content is essentially maintained and may, under certain circumstances, be augmented. Thus, the esters of thiophosphoric acid produced by the action of phosphorus sulfides, particularly phosphorus pentasulfide, on alcohols of the higher alkyl series such as octyl, dodecyl, octadecyl alcohols, and the like, or alcohols of the cycloparaffinic series such as cyclohexanol, methylcyclopentanol, methylcyclohexanol, and the like or aromatic alcohols such as phenols, alkylated phenols, alkylated naphthols, alkylated cresols, catechols, and the like, in which from one to three hydroxyl radicals are introduced into combination with the phosphorus sulfide moity to form a completely esterified product or a partially esterified product having residual acidity. In each of the products of this type, whether it be a so-called triester of thiophosphoric acid or an acid ester of thiophosphoric acid, or the like, the product of reaction has a minor to an appreciable amount of free acidity. A product of this type is unstable and corrosive to metals such as copper, iron, lead, and the like. Their stabilities are very considerably less than those of the corresponding metal derivatives, particularly in the presence of iron or other active catalytic metals. The thiophosphoric acid esters will decompose fairly rapidly at temperatures above 250° F. and will retain their original composition only if storage temperatures are kept low, of the order of 100° F. or less. It is of particular advantage, therefore, to prepare the metallic derivatives comprising essentially metallic salts of the partially or completely esterified thiophosphoric acid by the action of metal sulfur-containing compounds such as the alkali or alkaline earth or other metal sulfides, polysulfides, disulfides, sulfoxides, thiocyanates, and the like. This reaction has been carried out using water-free metal sulfur-containing compounds to produce a metal derivative whose sulfur content is materially better than that obtained with metallic hydroxide or carbonate or even with aqueous metallic sulfides with accompanying $H_2S$ loss, and whose properties are substantially improved in anti-corrosion properties, anti-sludging properties, storage stability, and the like.

The effect of the metal sulfur compounds in maintaining or augmenting the sulfur content has been demonstrated by the action of both organic and inorganic metal sulfur containing compounds upon a wax olefin-$P_xS_y$ compound (PSO–21 equivalent to $R_3P_2S_5$).

PSO 21 from wax olefin, diluted with an equal weight of 170 pale oil as an inert diluent was treated with the following metal derivative-forming reagents containing sulfur:

1. Potassium ethyl xanthate in varying proportions of $K_x$/PSO
2. Sodium thiocarbonate as 50 per cent solution equivalent to 2Na/PSO
3. Sodium polysulfide equivalent to 2Na/PSO.

For purposes of comparison, a PSO derivative with a potentially high metal content was prepared, using five volumes of 5 per cent alcoholic KOH as reagent, refluxing to two hours, separating the oily layer and recovering the PSO-metal derivative in a solvent-free state. The following tabulation presents a summary of the derivatives formed:

*Metal-PSO derivatives with high sulfur content from*

$$\frac{R_3P_2S_5}{2}$$

*where R=wax olefin=350 mol. wt.*

|   | Molal Ratio Metal Reactant | Molal Ratio of Metal Combined | Neut. No. of Prod. | Sulfur (theory) | Sulfur (found) | Change in Per Cent Sulfur | Per Cent Change |
|---|---|---|---|---|---|---|---|
| 1 | 1.0 | 1.6 | 4.0 | 12.01 | 11.64 | −0.37 | −2.3 |
| 1 | 2.0 | 2.6 |  | 11.67 | 10.22 | −1.45 | −12.8 |
| 1 | 4.0 | 4.6 | ¹0.5 | 11.04 | 11.40 | +0.36 | +3.6 |
| 2 | 2.0 | 1.8 | 5.0 | 12.20 | 12.46 | +0.26 | +2.5 |
| 3 | 2.0 | 1.7 | 0-0 | 12.22 | 14.92 | +2.70 | +22.1 |
| 3 | 4.0 | 1.0 | 0.25 | 12.38 | 15.43 | +3.10 | +25 |
| 4 | 5.5 | 1.2 | 0.25 | 12.15 | 6.60 | −5.55 | −45 |
| 5 | 0 | 0 | 4.0 | 12.6 | 12.5 | +0.1 |  |

1. Potassium ethyl xanthate.
2. Sodium thiocarbonate.
3. Sodium polysulfide.
4. Potassium hydroxide.
5. None.
¹ Basic.

It is evident that the metal sulfur containing compounds and particularly the organic metal sulfur compounds are outstanding in their sulfur sparing or sulfur augmenting action. With certain easily dissociated compounds such as the metal xanthates there is at first a slight decrease in sulfur content as metal derivative is formed. However, with higher metal content the initial sulfur losses are overcome and a modest gain in sulfur content is effected. With certain sulfur compounds such as the thiocarbonates, thiophosphates, polysulfides and the like, a modest to an appreciable increase in sulfur content may be effected even in the formation of a metal derivative having of the order of one equivalent weight of metal in combination per mole of phosphorus-sulfide reaction product. The high sulfur compounds so prepared are particularly to be contrasted with the metal derivatives prepared with the oxides, hydroxides or carbonates. Thus, while 5 or more moles of KOH, in alcoholic solution, were used to effect the formation of a metal derivative, only 1.2 equivalents of metal were combined with a concomitant loss of 45% of the original sulfur content. By my method of preparation it is at once possible to produce a $P_xS_y$ derivative having an appreciable to a high metal content and a retained high sulfur value or even an augmented sulfur content acting as an effective anti-oxidant and metal deactivating agent. Heretofore in bringing about the preparation of metal PS-R derivatives a displacement of the sulfur originally bound to phosphorus has been effected, such that the active inhibiting effect of the (—P—S—) unit structure has been largely reduced or destroyed.

In some instances certain investigators have recognized that the combined sulfur content of the additive is directly relatable to the effectiveness of the material as an inhibitor. In order then to prepare a compound having a high sulfur content or even a high sulfur to phosphorus ratio they have used a combination of free sulfur and phosphorus sulfide to effect the initial reaction. However such a product has all the disadvantages of the sulfurized hydrocarbon in that the sulfur used reduces the amount of $P_xS_y$ that can be combined and the sulfur so introduced is partially or wholly "active" sulfur such that a copper test strip is darkened on testing such an additive at 210° F. for thirty minutes or more. The data above show that a sulfurized olefin or fatty acid ester are markedly inferior to my preferred stabilized phosphorus sulfide additive. It is clear, then, that any free sulfur used to augment the sulfur content of the additive gives the product the sharply lower merit rating of a sulfurized product compared to the preferred, non-sulfurized product of my invention which has only stable and firmly bound sulfur in essentially the ratio initially present in the $P_xS_y$ reactant without using free sulfur or an added sulfur compound. Thus an outstanding analyzable characteristic of my preferred metal, phosphorus and sulfur containing organic composition is in its having:

(a) High stable sulfur to phosphorus ratio, which ratio is at least 80 per cent of the original S:P value in the $P_xS_y$ reactant and which has not been attained by the action of free sulfur or the addition of organic sulfur compounds and/or (b) An increased sulfur to phosphorus ratio which is generally attained by the action of metal organic sulfur compounds which introduce only stable sulfur into the combination, (c) High metal ratio in combination such that the metal derivative has high thermal stability as characterized by the above described additives having excess alkalinity, which excess alkalinity has been developed with both alkali and alkaline earth metals, (d) Stably bound sulfur such that a test blend does not darken a copper test strip exposed to the oil for 30 minutes at 210° F.

To further emphasize the difference between my compounds and those prepared from the known art, a PS—R compound treated with 8 per cent of dry KOH for 5 or more hours at 340–360° F. was taken for consideration. Assuming an organic compound of 1000 molecular weight treated with 10 per cent of $P_2S_5$, the PSR product will have the approximate formula $R_2 \cdot 2P_2S_5 = 2420$ g/mol. When this is treated with 8 per cent KOH dry, the KOH reactant equals 193.6 g. or 3.5 moles of KOH, giving a presumed compound of $K_{3.5}R_2 \cdot 2P_2S_5$. The analytical data for the final product show:

$$\left.\begin{array}{l} P = 2.8 \text{ per cent}/31 = .090 \\ S = 1.8 \text{ per cent}/32 = .056 \\ K = 3.0 \text{ per cent}/39 = .077 \\ R = 91.4 \text{ per cent}/1000 = .091 \end{array}\right\} K_{2.2}P_2S_{1.5}R_2$$

Summarizing the above:
(1) Only 2.2 equivalents of K are in combination from 3.5 equivalents available for reaction;
(2) Sulfur content has been reduced 30 per cent;
(3) Excess basicity has not been developed by this method—the product is shown to be acid with a neut. number of 7.5.

In another instance 500 g. of olefin polymer (of 1000 molecular weight) 167 g. of $P_2S_5$ and 10 g. of elemental sulfur were heated to 400° F. for 5 hours and subsequently the reaction product was treated for five hours at 400° F. with 88 g. of sodium sulfide with an appreciable evolution of $H_2S$. The reactants, if fully combined, would produce a compound having the formula Na 2.26 R 0.5 ($P_2S_5$) 0.76 S 0.3. The final product had the following analysis:

P = 6.13% ÷ 31 = 0.20
S = 8.40% ÷ 32 = 0.26
Na = 3.95% ÷ 23 = 0.17
R = 82.50% ÷ 1000 = 0.083 or, assuming no loss of organic reactant, R 0.8 P S 2.6 Na 1.7 or 1. $30/56$ of the total sulfur was not found in combination,
2. $22/39$ of the total sodium was not found in combination,
3. $26/50$ of the maximum original sulfur in combination with the phosphorus remained in combination.

The beneficial effect upon oil blends of my preferred high sulfur metal derivatives of $P_xS_y$ reaction products is shown in a series of thermal stability tests at 325° F. on various additives as follows:

*Thermal stability tests at 325° F. on PSO 21 and its metal derivatives*

[In 2 per cent solution—170 pale oil.]

| | Molal Ratio of Metal Reactant | Metal Reactant | Change in Conc. of Color Bodies,+·Hours | | |
|---|---|---|---|---|---|
| | | | 8 | 16 | 24 |
| 1. PSO-21 (no metal) | 0 | 0 | ¹ +490 | ² +1,029 | ² +1,240 |
| 2. PSO-21-4K₂ | 4.0 | K-et-KOH | −125 | −85 | +75 |
| 3. PSO-21-5KOH | 5.5 | KOH | +70 | +235 | ¹ +525 |

¹ Sludged.
² Heavily sludged.

When no metal derivative is present (No. 1) the oil blend of the $P_xS_y$ reaction product depreciates rapidly in color, as a measure of the degree of oxidation of the oil, and sludges badly. With a sulfur containing and sulfur sparing compound used in the ratio of four equivalent weights per mole of $P_xS_y$ reaction product (No. 2) the oil blend has outstandingly improved stability—the concentration of color bodies in the oil are at first actually decreased and then only slowly built up. By comparison (No. 3) a metal derivative using 5.5 equivalents of KOH and having a large part (45 per cent) of the originally combined sulfur eliminated in the derivative-forming reaction is less stable than No. 2. Sample No. 3 prepared with KOH was sludged in 24 hours, whereas the compound in which the originally combined sulfur was spared or augmented was not materially darkened or sludged in the same testing time. The new composition containing both a high metal content and high sulfur content shows such clear superiority over the low sulfur derivatives as to demonstrate a new composition and a new order of activity.

The data from the foregoing table is shown in the drawing and strikingly illustrates the differences above pointed out.

Illustrative of further specific differences between the metal derivatives of organo-thiophosphoric acids prepared with water-free metal sulfur-containing compounds, such as sodium sulfide, and those prepared from metal hydroxides, such as sodium hydroxide are the following preparations in which equivalent molecular quantities of metalizing reagent were used over a short period of time with dimethylcyclohexyl dithiophosphate.

(a) 1.05 equivalents of $Na_2S$ $$\frac{(1.05 \text{ moles})}{2}$$

dissolved in a minimum of water, heated and stirred with 1.0 mole of dimethylcyclohexyl dithiophosphate at 200° F. rising to 300° F. in 3 hours. Product filtered through paper and tested.

(b) 1.05 moles NaOH dissolved in a minimum of water, heated and stirred with 1.0 mole of dimethylcyclohexyl dithiophosphate diluted with two parts by weight of light neutral oil as diluent from 200° F. to 300° F. for 3 hours. Product filtered through paper and tested.

(c) The same as (b) above but using 1.05 equivalent of $Na_2S$ $$\frac{(1.05 \text{ moles})}{2}$$

for the reaction.

*Titration of free acidity in the product*

| | Mg. KOH/g. Original Sample |
|---|---|
| —di-ester acid | 135.4 |
| a. Na₂S, straight | 46.0 |
| b. NaOH, diluted 50/50 | 65.0 |
| c. Na₂S, diluted 50/50 | 57.0 |

For an equivalent reaction time and reactant ratio, the sodium sulfide products with consistently lower acid values show that the essentially water-free metal sulfides produce the more desirable products.

On exposure of 1 per cent blends of these metal derivatives to 325° F. for 16 hours, the results are as follows:

*Thermal test at 325° F. for 16 hours*

[1 per cent additive blend in 170 pale oil.]

| | Sludge Pptd. | Optical Density Increase |
|---|---|---|
| —acid ester | ¹ 100 | 565 |
| a. Na₂S acid ester straight | 0 | 1,215 |
| b. NaOH acid ester diluted | 80 | 1,745 |
| c. Na₂S acid ester diluted | 10 | 855 |
| d. BaS acid ester diluted | 60 | 745 |
| e. BaO acid ester diluted | 60 | 820 |

¹ Taking the acid-ester sludge value as 100 (max.).

The un-neutralized acid dithiophosphate produced a heavy sludge with still a light colored residual oil. The NaOH product darkened most and produced a heavy sludge, while both of the metal sulfide products gave less color depreciation and remarkably less sludge formation.

Further tests with barium sulfide and barium oxide show that the barium sulfide product has a lower acid value, and the blend in oil shows less color depreciation on thermal treatment than the corresponding barium oxide product.

The above description has emphasized the preparation of metal derivatives of phosphorus sulfide-treated organic compositions in which the combined metal is an appreciable portion of the total organic composition, such as would be from 200 per cent to 1,000 per cent or more of the value shown by the titratable acidity of the phosphorus sulfide-organo-product as obtained in the phosphorus sulfide reaction. In a product of this type I have particularly pointed out the means for producing a high sulfur metal derivative having excess alkalinity such as has not been heretofore produced but which is now shown as readily producible from metalizing and sulfurizing agents such as the organic or inorganic metal sulfides, polysulfides, hydrosulfides, and the like, under specific conditions of reaction.

The statement has been made above that the compounds of high sulfur content have not been prepared by the action of a mixed reagent comprising elemental sulfur and phosphorus sulfide, either together or in consecutive or independent reactions. This does not mean, however, that organo-phosphorus and sulfur-containing compositions may not be prepared by such mixed reagents. In fact, a compound prepared by the action of elemental sulfur and phosphorus sulfide in some cases has distinctive properties. The sulfurized organic compositions, such as sulfurized wax olefins, are recognized as having effective metal deactivating and anti-sludging properties. When these are used in combination with a phosphorus sulfide-treated product or a metal derivative of a phosphorus sulfide-treated product, the combined effect is in many cases superior to that which one might reasonably expect from either composition alone. For example, the organo-sulfur compound seems to have particular stabilizing effects upon the phosphorus sulfide addend, such that the phosphorus sulfide composition or blend containing the phosphorus sulfide-treated hydrocarbon appears to have improved storage stability and improved thermal stability. Certain other sulfur-containing organic compositions have been found to be particularly synergistic in their action with phosphorus sulfide organo compounds; for example, certain higher molecular weight aliphatic sulfides and disulfides and certain aromatic or alkylated aromatic sulfides and disulfides have been found to have particular activity in this regard. Certain metal derivatives of sulfur-containing compounds, such as the metal salt of phenolic sulfides or alkylated phenolic sulfides and disulfides, have also been found to be particularly effective, especially where the metal salt of such product contributes alkaline reserve to the composition. Such alkaline reserve appears to have particular benefit in stabilizing the otherwise slightly acidic phosphorus sulfide-treated material. A combination of these additives then appears to have unusual stability and thermal dissociation resistance, such that sludging and consequent acid formation in the composition are markedly reduced.

Instead of preparing the phosphorus and sulfur containing intermediate by the reaction of a phosphorus sulfide with an organic compound, as per Example I above, an intermediate product of unusually high sulfur concentration may be prepared by the use of a mixed reagent, i. e. by the simultaneous treatment of an organic compound with elemental sulfur and a phosphorus and sulfur containing reagent. An example of such is given in the following example:

*Example VI*

When one molal part of methyl ricinoleate is treated with one molal part of elemental sulfur and ¼ molal part of phosphorus pentasulfide under gradually rising temperature conditions to 350° F. and then held at 350° F. for approximately one hour under an inert gas atmosphere, a limpid oily product, dark in color, is obtained which has high oil solubility and particularly desirable additive properties. On a theoretrical basis, this compound should contain 18 per cent of sulfur at the maximum. Upon analysis of the filtered clear reaction product, a value of 16.3 per cent sulfur has been found by gravimetric methods which indicates that the product is essentially the sulfur and phosphorus sulfide combined reaction product in which 91 per cent of the theoretical sulfur has been effectively entered into the organo composition.

*Example VII*

To the quantities of PSO-21 diluent and antifrothing agent as in Example II, heated to 200–230° F. four molal quantities of potassium ethyl xanthate are added; the temperature is then raised to 300° F. and held in continuous agitation for one-half to one and one-half hours. For a more rapid reaction the temperature may be raised to 375° F. and held to three-quarters of an hour, under an inert gas atmosphere. The product is centrifuged or filtered.

In similar manner, sodium thiocarbonate is applied.

A particularly interesting and desirable additive has been prepared by the method outlined above in which both a sulfurized olefinic structure and a phosphorus-sulfurized ester type of structure is present. Such a compound has but one olefin bond for sulfurization and, accordingly, is not readily polymerized. Among the fatty acid esters, for example, the methyl or phenyl esters of ricinoleic acid, such a hydroxy-olefin ester structure is available. The fatty acid esters themselves contribute very desirable oiliness properties to a lubricant composition containing them. Further, the sulfurized esters have long been recognized to have high antisludging and anticorrosion properties; however, in the composition here particularly disclosed, a mixture of sulfur and phosphorus pentasulfide may be used to effect the production of a new composition having particularly interesting properties in that a thiophosphoric acid ester type structure is at hand upon which metal derivative compositions may be based, and a sulfurized or phosphorus sulfurized olefin structure is also at hand having the outstanding characteristics above described.

It is evident, that a compound of this type in which sulfur and phosphorus sulfide are combined in one molecule has certain particularly desirable properties for lubricants in which high antisludging, anticorrosion, and metal deactivating functions are required. The additives prepared from such a product have, in addition to the properties of the metal derivatives hereinabove disclosed, the advantages of oiliness, load-carrying capacity, excellent chemical stability, and outstanding protection to metals exposed to rusting conditions in water-oil systems or oily systems exposed to corrosive water vapor.

A further and perhaps more important and pronounced cooperative effect is the extent to which the combination of addition agents or the union of several functional addition agents in one molecule act to decrease the tendency of refined mineral lubricating oils containing them to be corrosive to metal surfaces, especially those composed of sensitive bearing metals such as copper-lead and cadmium-silver. These additive compositions have an additional advantage of being relatively insensitive to copper, such that the copper bearings are not blackened undesirably as is the case with most sulfurized organic compositions alone.

In certain instances, other addition agents act in a co-operative manner to produce unusual and desirable results. For example, certain halogen-bearing acid esters have been employed, such as methyl dichlorstearate, chloro-phenyl palmitate, and the like, which act to produce a highly effective anticorrosion agent having particular oiliness characteristics which apparently contribute to the additives' effectiveness unexpectedly.

While the above description is of a phosphorus and sulfur containing metal derivative of an organic compound, preferred methods of making the same, and of the use of such compounds as or in lubricant oil, my invention is not limited to such uses since the products of the type here disclosed may be used in other petroleum products such as white oils, greases, waxes, cutting oils, extreme-pressure lubricants, and the like to increase the resistance of such products to oxidation, corrosion, sludging, and to act as metal deactivators to deactivate catalytic metals with which the above products may come in contact.

It is to be understood that the examples given are by way of illustration only and not by way of limitation and that the theories advanced with regard to the action of the phosphorus sulfurized olefins and generally of the metal derivatives of phosphorus sulfurized organic compounds having a high sulfur content are the basis of my conception of these products and their action. I do not wish to be bound by the theory but base my claims upon the improved results which are obtained with these compounds.

The metal derivatives of the present invention may be prepared with various ratios of combined metal and from various metal reactants either as elements or as compounds. I have found, generally, that high thermal stability and outstanding antioxidant, antisludging and anticorrosion characteristics in addition to detergency are brought about by the introduction of an appreciable quantity of combined metal at least of the order of one equivalent of metal per mole of phosphorus-sulfide reaction product, particularly where this is effected in a manner such that the organic sulfur content is not appreciably reduced and is preferably maintained at the original level, or may actually be augmented.

The metal derivatives of the phosphorus-sulfur-metal products herein disclosed are particularly different from those heretofore described in that the metal derivative comprises an appreciable quotient of the total composition, in fact such a quantity of combined metal as to be some multiple function of the original available acidity of the phosphorus sulfide hydrocarbon. These metal derivatives are further characterized by the high sulfur content maintained therein, which high sulfur content has been maintained or augmented by the action of a metal-derivative-forming compound containing a sulfur atom or radical in combination, such compounds being the organic or inorganic metal sulfides, hydrosulfides, disulfides, polysulfides, thiocyanates, mercaptides, sulfonates, thiophenolates, thiocarbonates, xanthates, xanthogenates, and the like. The metal compounds having an efficacious reaction in this connection are particularly the alkali metals, alkaline earth metals, and other active sulfide-forming metals.

The high sulfur-containing metal derivatives of the phosphorus sulfide reaction products here disclosed have outstandingly superior properties as lubricant additives. In effecting an equivalent inhibition of oxidation, corrosion, sludging, and the like, they are roughly four times as effective as the simple sulfurized olefin and more than twice as effective as the related phosphorus sulfide-olefin products. As little as .01 of 1 per cent of the metal-containing high sulfur compounds of the present invention is effective in appreciably increasing the resistance of the oil containing such additives to oxidation, corrosion, sludging, and the like. Higher concentrations of the additives are effectively used. As much as 20 per cent or more of the additives may efficaciously be used under certain circumstances, producing beneficial results in the lubricant compositions thus prepared. For duty in automotive oils of the typical crankcase oil type, the compositions herein described are effective in very minute concentrations or in larger concentrations, but are particularly useful in concentrations ranging from .5 of 1 per cent to approximately 4 per cent. In lubricants of the heavy duty or Diesel type where detergency is a requirement as well as oxidation stability, anticorrosion, and antisludging properties, concentrations of the preferred metal-containing phosphorus sulfide compositions in the range of from 1 per cent to 10 per cent are highly efficacious in producing the desired heavy duty characteristics in the lubricating oil composition.

Although the addition agents contemplated hereby have a high degree of detergent action, particularly in certain types of oils, when used as the sole addition agent, highly advantageous results may be obtained by using these addition agents with others, notably other oil-soluble organic metal compounds, which, themselves, effect a higher degree of detergency when used in hydrocarbon oils. Examples of such organic metal compounds are the oil-soluble salts of:

Organic acids produced by oxidation of petroleum fractions
Naphthenic acids
Fatty acids
Halogenated fatty acids, such as dichlor stearic acid
Aromatic acids such as phenyl stearic acid and chlorphenyl stearic acid
Sulphonic acids, e. g. sulphonic acids derived from petroleum
Substituted phosphorus acids containing an organic substituent, e. g. the aliphatic, cycloaliphatic, and aromatic acid esters of phosphoric acid, thio phosphoric acids, phosphorous acid and thio phosphorous acids The oil-soluble metallic phenates may also be used, such as those derived from such phenolic compounds as:

Alkylated phenols such as cetyl phenol and lauryl phenol
Esters of salicylic acid such as lauryl salicylate and cetyl salicylate
Halogenated alkyl phenols and esters of phenolic acids such as lauryl chlorophenols and lauryl chlorosalicylate Sulphides and polysulphides derived from phenol and alkylated phenols, such as di(tertiary amyl hydroxy-phenyl) sulphides di(tertiary amyl hydroxy-phenyl) disulphides Specific examples of such detergent addition agents are the following:

Calcium naphthenate
Cobalt naphthenate
Aluminum naphthenate
Aluminum chlorophenyl stearate
Aluminum cetyl phenate
Calcium oleate
Calcium dichlor stearate
Cobalt dichlor stearate
Calcium phenyl stearate
Calcium chlorophenyl stearate
Calcium cetyl phenate
Calcium lauryl phenate
Magnesium phenate of lauryl salicylate
Calcium laurylchlorophenate
Magnesium phenate of lauryl chlorosalicylate
Calcium phenate of di(tertiary amyl hydroxyphenyl) sulphide
Calcium salt of mono-cetyl phosphate
Calcium salt of di-cetyl phosphate
Calcium salt of di-lauryl phosphate
Aluminum salt of mono-cetyl phosphate
Aluminum salt of di-cetyl phosphate
Calcium salt of mahogany acids (petroleum sulphonic acids)
Barium salt of mahogany acids
Sodium salt of mahogany acids
Chromium salt of mahogany acids
Cobalt salt of mahogany acids The metal salts of this invention may advantageously be used with detergents comprising combinations of oil-soluble metallic compounds. Examples of such combinations are:

(a) The combination of a metallic phenate with the metallic salt of this invention.

(b) The combination of an oil-soluble metallic alcoholate with an oil-soluble metallic salt of this invention.

(c) The combination of an oil-soluble metallic phenate with an oil-soluble metallic salt of a sulphonic acid and a metallic salt of this invention.

(d) The combination of an oil-soluble metallic alcoholate with an oil-soluble metallic salt of a sulphonic acid and a metallic salt of this invention.

It is also within the contemplation of the invention to provide the addition agents in the form of a homogeneous concentrate in a suitable oil, said oil containing rather high percentages of the addition agents. Such concentrates may be employed for further blending with a blended lubricating oil in the proportion desired for the particular condition of use.

While mineral oil generally is the principal ingredient of the blended lubricant, it is not essential that it be the only ingredient other than the addition agents, provided only there is no additional ingredient present which is incompatible with the addition agent. It is within the contemplation of this invention to include, if necessary or desirable, such other addition agent or agents as are commonly added to improve certain specific properties of the oil, such as cold test, oiliness, anticorrosion, stability to oxidation, detergency, and the like.

When used in conjunction with a blended hydrocarbon oil, it is to be understood that, generally, only such amounts of the additive be incorporated as are soluble in the specified amount of oil. By the term "soluble," as herein used, it is intended to indicate the ability to form not only true solutions but also any form of substantially clear, permanently homogeneous composition when incorporated in a blended mineral oil base. Since quite small percentages often give remarkably improved results, it is seldom of extreme importance that the addition agent be oil soluble in all proportions. In compounding lubricant compositions with the above described properties, mineral lubricating oil is preferred as the additive carrying medium; however it is within the intention of the disclosure to include in the blended oil other components such as vegetable oils, animal oils, synthetic oils, light oil distillates, or aromatic solvents in which these additives may be dissolved or dispersed with substantial permanence.

The materials prepared in accordance with the present invention can be employed for a large variety of uses in which wetting, penetrating, detergent, emulsifying and other interface modifying functions are required. Illustrative of some of the many purposes for which these materials can be used are: as antirust agents in automobile radiators, for dispersing pigments and the like in liquid vehicles, as a penetrating agent in leather dressings, as a penetrating and/or emulsifying agent in cosmetics, as a fat splitting agent, and as wetting and/or emulsifying agents in combination with mineral oils or fatty oils, for slushing oils, soluble oils, cutting oils, textile lubricants, drawing lubricants and many others.

Corrosion in heat-exchange devices, such as, for example, automobile radiators, can be inhibited by adding small amounts, for example, from about 0.5 per cent to about 5 per cent of the products of the present invention to the heat-exchange medium such as water or aqueous mixtures containing freezing point depressants such as ethanol, methanol, glycerol, ethylene glycol, etc. The heat exchange medium may also contain an emulsifying agent and as a salt of sulfonic acids obtained in the sulfuric acid treatment of mineral oils.

Compositions useful as textile lubricants may comprise from about 50 per cent to about 90 per cent of a highly refined low viscosity mineral oil, having a viscosity of about 60–90 seconds Saybolt Universal at 100° F. from about 1 per cent to about 20 per cent of fatty acid, such as oleic acid, from about 0.5 per cent to about 40 per cent of an alkali metal soap of the sulfonic acids derived by the treatment of mineral oils with sulfuric acid and from about 0.5 per cent to about 10 per cent of a phosphorus sulfide reaction product of the present invention.

Soluble oils suitable for use in metal working operations may contain from about 60 per cent to about 35 per cent lubricating oil, 0.5 per cent to about 10 per cent of a reaction product of the present invention, from about 10 per cent to about 30 per cent of a petroleum sulfonic acid soap. Other constituents such as water, alcohol, oleic acid, bacteria controlling agents, etc., can be included.

Compositions, otherwise, known as slushing compounds, adapted to be applied to metal surfaces to prevent or inhibit rusting and/or corrosion, containing from about 0.5 per cent to about 10 per cent of a product of the present invention, and mineral oil are very effective. These slushing compounds may contain in addition to petrolatum, a soap of preferentially oil-soluble petroleum sulfonic acid wax, and/or other derived ingredients.

It will be understood that as certain features and subcombinations are of utility they may be employed without reference to other features and subcombinations. This is contemplated by and is within the scope of my claims. It is further obvious that various changes may be made in the field within the scope of my claims without departing from the spirit of the invention. It is, therefore, to be understood that this invention is not to be limited to the specific field shown and described.

Other modes of applying the principle of the invention may be employed, change being made as regards the details described, provided the features stated in any of the following claims or the equivalent of such be employed.

I therefore particularly point out and distinctly claim as my invention:

1. The metal and phosphorus and high sulphur product produced by heating a phosphorus and sulphur-containing organic compound of molecular weight at least 150 with a combining amount of a metal salt of carbon-sulphur acid, of the class consisting of thiocarbonates and xanthates.

2. The metal and phosphorus and high sulphur product produced by heating a phosphorus and sulphur-containing organic compound of molecular weight at least 150 with a combining amount of a metal salt of carbon-sulphur acid, of the class consisting of thiocarbonates and xanthates.

3. The metal and phosphorus and high sulphur product produced by heating a phosphorus and sulphur-containing hydrocarbon wax having an unsaturated content with a metal salt of carbon-sulphur acid, of the class consisting of thiocarbonates and xanthates.

4. The metal and phosphorus and high sulphur product produced by heating a phosphorus and sulphur-containing organic compound of molecular weight at least 150 with a combining amount of an alkali metal thiocarbonate.

5. The metal and phosphorus and high sulphur product produced by heating a phosphorus and sulphur-containing olefinic compound of molecular weight at least 150 with a combining amount of an alkali metal thiocarbonate.

6. The metal and phosphorus and high sulphur product produced by heating a phosphorus and sulphur-containing hydrocarbon wax with a combining amount of an alkali metal thiocarbonate.

7. The metal and phosphorus and high sulphur product produced by heating a phosphorus and sulphur-containing organic compound of molecular weight at least 150 with a combining amount of potassium ethyl xanthate.

8. The metal and phosphorus and high sulphur product produced by heating a phosphorus and sulphur-containing olefinic compound of molecular weight at least 150 with a combining amount of potassium ethyl xanthate.

9. The metal and phosphorus and high sulphur product produced by heating a phosphorus and sulphur-containing hydrocarbon wax with a combining amount of potassium ethyl xanthate.

10. The method of producing a metal and phosphorus and high sulphur product, which comprises heating a phosphorus and sulphur-containing organic compound of molecular weight at least 150 with a combining amount of a metal salt of carbon-sulphur acid, of the class consisting of thiocarbonates and xanthates.

11. The method of producing a metal and phosphorus and high sulphur product, which comprises heating a phosphorus and sulphur-containing olefinic compound of molecular weight at least 150 with a combining amount of a metal salt of carbon-sulphur acid, of the class consisting of thiocarbonates and xanthates.

12. The method of producing a metal and phosphorus and high sulphur product, which comprises heating a phosphorus and sulphur-containing hydrocarbon wax with a combining amount of a metal salt of carbon-sulphur acid, of the class consisting of thiocarbonates and xanthates.

13. The method of producing a metal and phosphorus and high sulphur product, which comprises heating a phosphorus and sulphur-containing organic compound of molecular weight at least 150 with a combining amount of an alkali metal thiocarbonate.

14. The method of producing a metal and phosphorus and high sulphur product, which comprises heating a phosphorus and sulphur-containing olefinic compound of molecular weight at least 150 with a combining amount of an alkali metal thiocarbonate.

15. The method of producing a metal and phosphorus and high sulphur product, which comprises heating a phosphorus and sulphur-containing hydrocarbon wax with a combining amount of an alkali metal thiocarbonate.

16. The method of producing a metal and phosphorus and high sulphur product, which comprises heating a phosphorus and sulphur-containing organic compound of molecular weight at least 150 with a combining amount of potassium ethyl xanthate.

17. The method of producing a metal and phosphorus and high sulphur product, which comprises heating a phosphorus and sulphur-containing olefinic compound of molecular weight at least 150 with a combining amount of potassium ethyl xanthate.

18. The method of producing a metal and phosphorus and high sulphur product, which comprises heating a phosphorus and sulphur-containing hydrocarbon wax with a combining amount of potassium ethyl xanthate.

JOSEPH M. HERSH.

REFERENCES CITED

The following references are of record in the file of this patent:

UNITED STATES PATENTS

| Number | Name | Date |
| --- | --- | --- |
| 1,772,386 | Derby | Aug. 5, 1930 |
| 2,034,665 | Ott | Mar. 17, 1936 |
| 2,063,629 | Salzberg et al. | Dec. 8, 1936 |
| 2,316,091 | White | Apr. 6, 1943 |
| 2,342,431 | Smith | Feb. 22, 1944 |
| 2,343,213 | Ashley | Feb. 29, 1944 |
| 2,344,395 | Cook et al. | Mar. 14, 1944 |
| 2,347,592 | Cook et al. | Apr. 25, 1944 |
| 2,348,080 | Lincoln | May 2, 1944 |
| 2,362,624 | Gaynor et al. | Nov. 14, 1944 |
| 2,372,358 | Cook et al. | Mar. 27, 1945 |
| 2,377,955 | Mixon | June 12, 1945 |
| 2,382,775 | Cook et al. | Aug. 14, 1945 |